(12) United States Patent  
Knoedgen et al.

(10) Patent No.: US 7,486,309 B2
(45) Date of Patent: Feb. 3, 2009

(54) DIGITAL CAMERA MODULE TEST SYSTEM

(75) Inventors: Horst Knoedgen, Munich (DE); Dirk Huettmann, Baltmannsweiler (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 757 days.

(21) Appl. No.: 10/930,351

(22) Filed: Aug. 31, 2004

(65) Prior Publication Data

US 2006/0041787 A1    Feb. 23, 2006

(30) Foreign Application Priority Data

Aug. 17, 2004    (EP)    .................................. 04368054

(51) Int. Cl.
*H04N 7/18* (2006.01)
*H04N 17/00* (2006.01)

(52) U.S. Cl. .................... 348/187; 348/188; 348/92; 348/93

(58) Field of Classification Search ......... 348/187, 348/188, 175, 176, 125, 92, 93; 356/72, 356/73, 237.1, 239.2, 124; 324/754–759; 382/141; 702/57, 81, 82, 116, 121, 123; 700/108–110
See application file for complete search history.

(56) References Cited

U.S. PATENT DOCUMENTS

| | | | |
|---|---|---|---|
| 4,298,944 A | 11/1981 | Stoub et al. | 364/515 |
| 4,612,666 A | 9/1986 | King | 382/32 |
| 5,179,437 A | 1/1993 | Kawada et al. | 358/10 |
| 5,649,258 A | 7/1997 | Bergstresser et al. | 396/429 |
| 6,184,675 B1 | 2/2001 | Bannai | 324/158.1 |
| 6,201,600 B1 | 3/2001 | Sites et al. | 356/124 |
| 6,219,443 B1 | 4/2001 | Lawrence | 382/141 |
| 6,366,312 B1 * | 4/2002 | Crittenden | 348/187 |
| 6,512,587 B1 | 1/2003 | Marcus et al. | 356/497 |

(Continued)

FOREIGN PATENT DOCUMENTS

EP    0 656731 A    7/1995

(Continued)

OTHER PUBLICATIONS

Co-pending U.S. Patent App., Filed Apr. 16, 2003, U.S. Appl. No. 10/417,317, assigned to the same assignee, "Miniature Camera Module".

(Continued)

*Primary Examiner*—Victor R Kostak
(74) *Attorney, Agent, or Firm*—Saile Ackerman LLC; Stephen B. Ackerman

(57) ABSTRACT

A test system for digital camera modules used in consumer electronics, e.g. cellular phones and PDA's is shown. The test system comprises of a tester and a module handler that is aimed at reducing test time by an order of magnitude. The Test system has an image-processing unit that uses N-parallel processor to reduce the computation time on a test image by approximately the number of parallel processors. The handler is controlled by the tester to select, focus and test small digital camera modules. There are two test stations in the handler, where a first test station performs tests on a first camera module while a second test station is loaded with a second camera module, thus burying the loading time within the test time.

79 Claims, 11 Drawing Sheets

U.S. PATENT DOCUMENTS

| | | | |
|---|---|---|---|
| 7,103,208 B2 * | 9/2006 | Wengender et al. | 382/141 |
| 7,158,170 B2 * | 1/2007 | Gustavsson et al. | 348/187 |
| 7,188,036 B2 * | 3/2007 | Strittmatter | 702/57 |
| 2002/0080266 A1 | 6/2002 | Shinamiya et al. | 348/374 |
| 2002/0191973 A1 | 12/2002 | Hofer et al. | 396/80 |
| 2003/0002749 A1 | 1/2003 | Vehvilainen | 382/275 |
| 2003/0030648 A1 | 2/2003 | Baer | 345/589 |
| 2003/0112360 A1 | 6/2003 | Liao et al. | 348/362 |
| 2003/0142374 A1 | 7/2003 | Silverstein | 358/504 |
| 2003/0146976 A1 | 8/2003 | Liu | 348/207.1 |
| 2003/0193604 A1 * | 10/2003 | Robins et al. | 348/335 |
| 2004/0027456 A1 | 2/2004 | Pierce | 348/175 |
| 2004/0032496 A1 | 2/2004 | Ebenstein et al. | 348/187 |
| 2004/0189812 A1 * | 9/2004 | Gustavsson et al. | 348/207.99 |
| 2005/0231596 A1 * | 10/2005 | Marchese | 348/187 |
| 2007/0091334 A1 * | 4/2007 | Yamaguchi et al. | 358/1.9 |

FOREIGN PATENT DOCUMENTS

| | | |
|---|---|---|
| EP | 0679932 | 11/1995 |
| EP | 1 348996 A | 1/2003 |
| EP | 1286553 | 2/2003 |
| EP | 13 82194 A1 | 1/2004 |
| EP | 13 89878 A1 | 2/2004 |
| JP | 03099376 A | 4/1991 |
| JP | 11 275467 A | 8/1999 |
| JP | 2001292461 | 10/2001 |
| JP | 2002077955 | 3/2002 |
| JP | 2002232918 | 8/2002 |
| JP | 2002290994 | 10/2002 |
| JP | 2003101823 | 4/2003 |
| JP | 2003157425 | 5/2003 |
| JP | 2003179949 | 6/2003 |
| JP | 2003035746 A | 7/2003 |
| JP | 2003219436 | 7/2003 |
| JP | 2003259126 | 9/2003 |
| WO | WO02102060 | 12/2002 |

OTHER PUBLICATIONS

Co-pending U.S. Patent App., Filed May 8, 2003, U.S. Appl. No. 10/434,743, assigned to the same assignee, "Test System for Camera Modules".

Co-pending U.S. Patent App., Filed Aug. 30, 2004, U.S. Appl. No. 10/929,651, to the same assignee.

Co-pending U.S. Patent App., Filed Aug. 31, 2004 U.S. Appl. No. 10/930,353, to the same assignee.

Co-pending U.S. Patent App., Filed Aug. 30, 2004, U.S. Appl. No. 10/929,652, to the same assignee.

Co-pending U.S. Patent App., Filed Aug. 30, 2004, U.S. Appl. No. 10/929,300, to the same assignee.

Co-pending U.S. Patent App., Filed Aug. 30, 2004, U.S. Appl. No. 10/929,653, to the same assignee.

Fijitsu Automation Ltd., XP-002319159, "Camera Module Testing System CMT-102-V4," Oct. 2003.

* cited by examiner

DIGITAL CAMERA MODULE TEST SYSTEM

RELATED PATENT APPLICATION

This application is related to U.S. patent application, Ser. No. 10/929,651, filed on Aug. 30, 2004, and assigned to the same assignee as the present invention.

This application is related to U.S. patent application, Ser. No. 10/930,353, filed on Aug. 31, 2004, and assigned to the same assignee as the present invention.

This application is related to U.S. patent application, Ser. No. 10/929,652, filed on Aug. 30, 2004, and assigned to the same assignee as the present invention.

This application is related to U.S. patent application, Ser. No. 10/929,300, filed on Aug. 30, 2004, and assigned to the same assignee as the present invention.

This application is related to U.S. patent application, Ser. No. 10/929,653, filed on Aug. 30, 2004, and assigned to the same assignee as the present invention.

BACKGROUND OF THE INVENTION

1. Field of Invention

The present invention relates to semiconductor test systems and in particular test systems for miniature digital camera modules.

2. Description of Related Art

The digital camera is becoming a ubiquitous device. Not only are digital cameras replacing the traditional film camera, digital camera devices are being used in many other applications, such as small electronic devices, such as PDA (personal data assistant) and cellular phones. With the explosion of cellular phones, the ability to take a picture and then send that picture to another individual using a second cellular phone comes the need to produce inexpensive digital camera modules and efficiently test these modules in large quantities. This is further complicated by the many different module configurations that are emerging as a result of the many different application requirements, including fixed focus, manual focus and automatic focus as well as physical size. The testing time for digital camera module, which can have mega-pixel capability, has traditionally been a relatively long process (approximately sixty seconds for a module with 0.3 megapixels) to insure the integrity and picture quality of the camera. This necessitates a testing capability, which insures the integrity and specification of the digital camera module, and which is quick and handles a large quantity of modules.

A patent application, Ser. No. 10/417,317 dated Apr. 16, 2003, is related to miniature cameras and their manufacturing methods that are used as built-in modules in hand held consumer electronics devices such as mobile phones and PDA's. In a second patent application, Ser. No. 10/434,743 dated May 8, 2003, a test system is described for digital camera modules used as built-in modules for consumer electronics, which performs electrical tests, adjustment of focus and sealing of the lens barrel with glue.

In addition there are a number of other prior art patents that are directed to testing of digital cameras: US 20040032496A1 (Eberstein et al.) is directed to a method of camera calibration and quality testing; EP 1389878A1 (Bednarz et al.) is directed to a method of camera calibration and testing camera quality; US 20040027456A1 (Pierce) directed to the use of calibration targets; EP 1382194A1 (Baer) is directed to dark current subtraction; JP 2003259126 (Keisuke) is directed to removing noise of an image; US 20030146976A1 (Liu) directed to a digital camera system enabling remote monitoring; JP 2003219436 (Fuminori) is directed to adjustment of a pixel shift camera; US 2003142374 (Silverstein) is directed to calibrating output of an image output device; JP 2003179949 (Hidetoshi) is directed to a luminance level inspection apparatus; JP 2003157425 (Vehvilainen) is directed to improving image quality produced in a mobile imaging phone; JP 2003101823 (Kenichi) is directed to specifying a picture data area; EP 1286553 A2 (Baer) is directed to a method and apparatus for improving image quality; US 20030030648 (Baer) is directed to a method and apparatus for improving image quality in digital cameras; U.S. Pat. No. 6,512,587 (Marcus et al.) is directed to measurement method and apparatus of an imager assembly; US 20030002749 (Vehvilainen) is directed to a method and apparatus for improving image quality; US 20020191973 A1 (Hofer et al.) is directed to a method and apparatus for focus error reduction; WO 2002102060 A1 (Baer) is directed to a method and apparatus for smear in digital images using a frame transfer sensor; JP 2002290994 (Hidetoshi) is directed to a method and apparatus to detect foreign matter on the surface of a lens; JP 200223918 (Yanshinao) is directed to an image inspection device and method for a camera module; JP 2002077955 (Keisuke) is directed to a method and apparatus for evaluating camera characteristics; JP 2001292461 (Keisuke) is directed to a system and method for evaluating a camera; U.S. Pat. No. 6,219,443 B1 (Lawrence) is directed to a method and apparatus for inspecting a display using a low resolution camera; U.S. Pat. No. 6,201,600B1 (Sites et al.) is directed to a method and apparatus for inspection of optically transmissive objects having a lens; U.S. Pat. No. 5,649,258 (Bergstresser et al.) is directed to an apparatus and testing of a camera; EP 0679932 B1 (Kobayashi et al.) is directed to testing an electronically controlled camera; U.S. Pat. No. 5,179,437 (Kawada et al.) is directed to an apparatus for color correction of image signals of a color television camera; JP 03099376 (Hiroshi) is directed to the quality of a display screen; U.S. Pat. No. 4,612,666 (King) is directed to a pattern recognition apparatus; and U.S. Pat. No. 4,298,944 Stoub et al.) is directed to a method and apparatus for distortion correction for scintillation cameras.

SUMMARY OF THE INVENTION

It is an objective of the present invention to provide a test system to quickly and efficiently test a digital camera module.

It is still an objective of the present invention to provide a test system that thoroughly tests a digital camera module to within less than an order of magnitude of traditional test times for digital camera modules.

It is also an objective of the present invention to provide a test system to be able to test digital camera module having a plurality of shapes and sizes.

It is further an objective of the present invention to provide the capability to test both fixed focus and variable focus digital camera module.

It is still further an objective of the present invention to adjust variable focus modules and fix the focus of the manually variable focus modules.

In the present invention a tester is coupled to a handler containing two test stations. The tester controls the operation of the handler, the test sequence including the applied electrical and optical stimulus and calculates results obtained from picture images take by the digital camera module under test (MUT) to determine that the MUT meets the specification of the digital camera module. While a first MUT is being tested in a first test station, a second test station is loaded with a second MUT and waits test until the first MUT finishes test.

This buries the overhead of the loading time of a MUT within the testing time of another MUT The tester coupled to the handler and its test stations controls the operation of the handler and performs test on the digital camera modules. Once a tray containing digital camera modules has been positioned and the tray has been scanned to detect missing modules, a robot selects a module and places it into a test fixture of a test station. Contact is made to the I/O pins of the MUT and DC tests are performed to determine such parameters as I/O pin continuity, leakage, and MUT temperature from a diode within the MUT.

The tester contains four separate parallel processors operating in parallel. Each processor is associated with its own memory performs calculations on a portion of an image captured from the MUT. A frame grabber associated the computer system of the tester synchronizes the light source of the test station with the clock of the MUT, captures a picture image from the MUT and stores that image into the memory associated with the corresponding parallel processor. Each of the parallel processors operate in parallel on different portions of the image collected from the MUT using computational routines such as fast Fourier transforms to analyze the image data. The use of the parallel processors operating in parallel reduces the time to make calculations on a image by approximately the number of parallel processors used. The data presently involves approximately three hundred thousand (300,000) pixels and is evolving to greater than megapixels (>1,000,000) in future miniature digital camera modules. Although, the test system of the present invention contains four parallel processors to compute the results of image tests on a digital camera module, the number parallel processors is not limited to four and can be less than or greater than four depending upon the requirements of the test system and the MUT.

The frame grabber synchronizes the light source and optical system contained within test station, captures a picture image from the digital camera MUT and stores a portion of the image into each memory associated with each parallel processor. Each of the parallel processors are used to operate on different portions of the picture image and each processor perform the calculations in parallel that are necessary to determine the picture taking capability of the MUT, reducing the pixel data to image parameters that are easily transmitted to the host processor coupled to the test system within the test time of a MUT.

The test system controls an optical unit within each test station to select focus targets and to position the targets to measure the focus of the MUT. A field lens is used to make the focus targets be at a virtual distance from the MUT, which makes the targets appear to be at a different distance from the MUT than physically exists in the test station. The distance of the focus targets are adjustable under the control of the tester to establish the required virtual distance of each target from the MUT ranging from the shortest focal distance to optical infinity. A plurality of targets at different physical distances from the MUT are placed between the light source and the field lens within the optical system of each test station under the control of the tester. Each target may have a different pattern dependent on the test requirement and the virtual distance of the target from the MUT. Although four targets are used, it by no means limits the number of targets. A fewer or greater number of targets are within the scope of the present invention depending upon the digital camera module testing requirements.

For a MUT with a manual adjustable focus, an electrical contact is made to the MUT by the test station and the MUT is aligned under an optical reference line, The tester then controls the focus of the MUT leaving the final adjustment in place throughout the remainder of the testing of the MUT. When testing of the modules contained within a test tray is complete and the tray exits the test station, and the lens adjustment cap of each manually adjustable module is permanently fixed by using glue, a laser or any equivalent process that will permanently fix in place the focus of the manually adjustable lens cap on the MUT. For a MUT with automatic focus, the tester electrically controls the focus of the MUT and using the optical target system of the test station, insures that the focus range of the automatic focus meets the specifications of the digital camera having automatic focus capability.

The optical system of each test station contains a minimum of four different light colors, blue, red, green and infrared; however, there is a capacity to include additional light colors as needed by the test requirements of a MUT. Each of the different light colors created by light emitting diodes (LED) are controlled to turn on and off quickly by the tester to facilitate the fast testing time of the MUT. The MUT is tested to the different colors of light and includes, but is not limited to, sensitivity to each color, leakage between pixel receptors of each color, bad pixels, noise including fixed pattern noise (FPN) and the ability of the MUT to block infrared light. A frame grabber captures a digital picture from the MUT for optical tests requiring computation to determine a test parameter and stores a portion of the picture into the memory associated with each the parallel processors. Each of the parallel processors operates on a portion of each picture in parallel and performs the necessary calculations to determine the quality and capability of the MUT. The computation time required for a picture is approximately 1/N, where N is the number of parallel processors. The serial overhead of the parallel processing is very low since each parallel processor and its associated memory operate on picture data that is independent.

BRIEF DESCRIPTION OF THE DRAWINGS

This invention will be described with reference to the accompanying drawings, wherein.

DETAILED DESCRIPTION OF THE PREFERRED EMBODIMENT

Figure 1A:
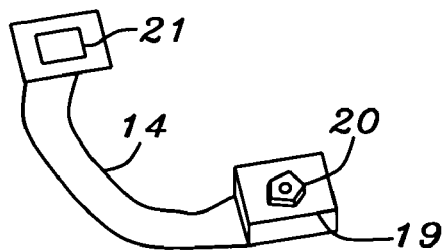
FIGS. 1A through 1D show examples of digital camera modules that are to be tested in the test system of the present invention.
Figure 1B:
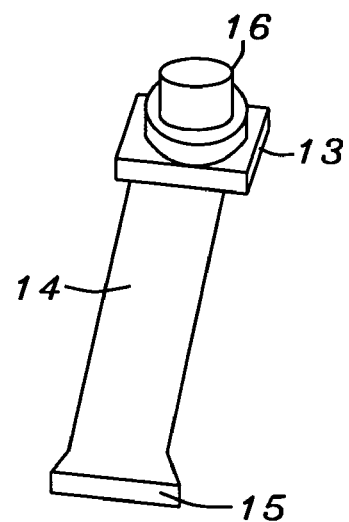
Figure 1C:
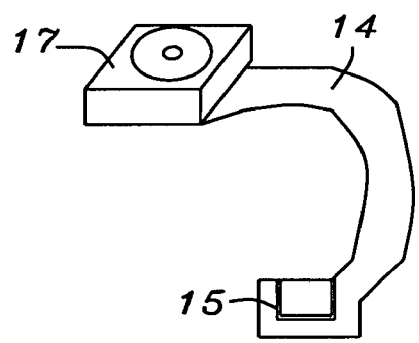
Figure 1D:
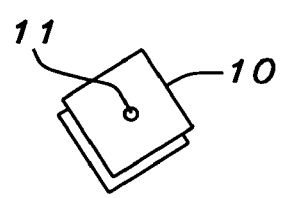

FIG. 1 shows examples of digital camera modules that are tested using the test system of the present invention. FIG. 1A is a digital camera module 19 with lens cap 20 having a hexagonal shape that allows manual focus adjustment. Other lens cap shapes can be used to allow manual focus adjustment, i.e. round, square, and octagonal. A flexible printed circuit 14 connects the module 19 to an electrical connector 21. The hexagonal shape of the lens cap, for example, allows a positive contact to a focus adjustment unit. FIG. 1B is a digital camera module 13 with a lens 16 having an automatic focus and a flexible printed circuit 14 to connect the digital camera module 13 to the connector 15. FIG. 1C is a fixed focus digital camera module 17 with a lead frame 14 connecting the module 17 to a connector 15. FIG. 1D is a leadless fixed focus module 10 in which the electrical contacts are located on the underneath side (not shown), and the lens opening 11 is centered in the middle of the top surface of the module. All of these digital camera modules are small (the flex lead length ranging approximately 1½ to 2 inches in length). The digital camera modules require precision handling to move them from a transport tray into a test station for electrical and optical testing. This movement back and forth between the test station, and the tray, including alignment in the test station, needs to be performed quickly so as to not slow down the testing of the modules.

Figure 2:
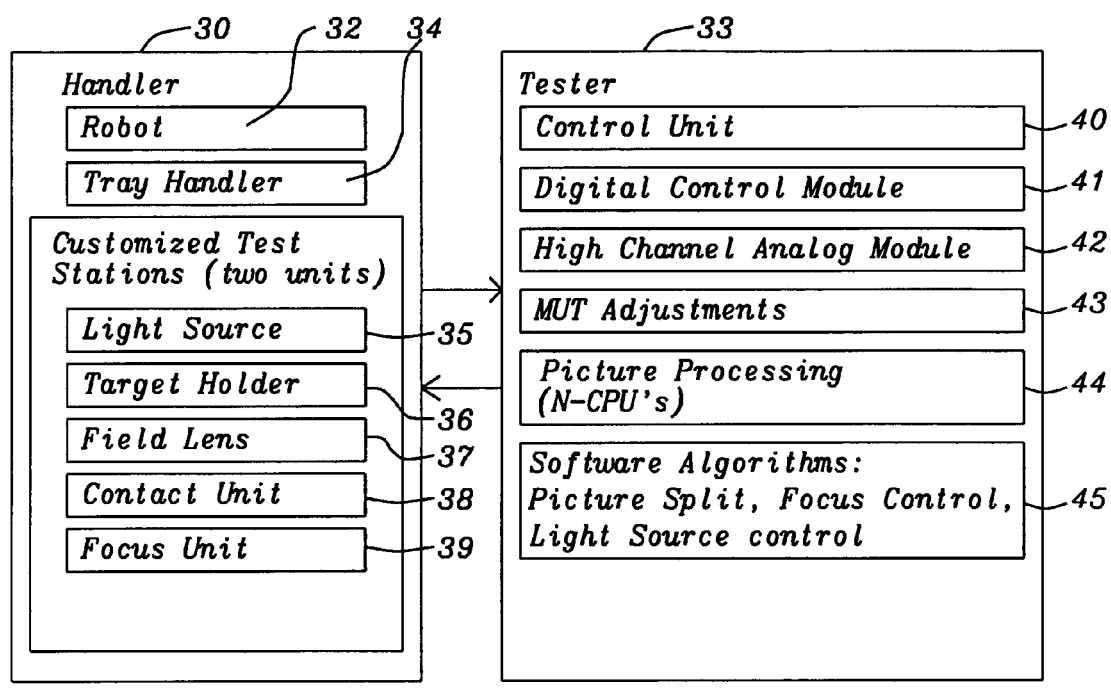
FIG. 2 shows basic architecture of the test system of the present invention.

FIG. 2 shows basic concept of the digital camera test system of the present invention. A Handler 30 containing two customized test stations 31 is coupled to a tester 33. The test stations are customized to accommodate a particular digital camera module 10, 13, 17 and 19. The examples of digital camera modules shown in FIG. 1 are only a sampling of the various configurations that can be handled by the customized test stations 31 and are not intended to limit the configuration of the test stations 31. Each test station 31 can be configured to test the same type or different types of digital camera modules depending upon the requirements of the manufacturing test line.

A tray handler 34 is used to transport a metal tray, which contains a plurality of digital camera modules that are accurately positioned in the tray, through the handler The tray of digital camera modules is position at an alignment mark so that the robot 32 can remove a digital camera module from the tray and place the module into a test station 31 customized to receive the module type contained on the tray. A digital camera module 11, 16, 17, 21 is placed into the test fixture by the robot 32 and is optically aligned in the test station. The optics system of the test station includes a light source 35 containing four different colors (red, blue, green and infrared), target wheels 36 used to hold targets that are used for testing the focus of the digital camera module under test (MUT) and a field lens 37. The field lens produces a virtual focus distance from the MUT of the targets located in the target wheels 36, which makes the targets used in focus testing of the MUT to appear to at a different distant from MUT than the physical distance between the MUT and the targets. A contact unit 38 connects to the electrical contacts of the MUT to allow the tester to apply electrical signals and obtain test data including test pictures. The focus unit 38 is used to adjust the focus of a MUT having a manual focus capability by physically adjusting the lens cap 20 on the MUT. In a MUT with an automatic adjustable focus, an electrical signal applied to the MUT is used to adjust the focus over the focus range of the MUT.

The tester 33 controls the operation of the handler 30 with the control unit 40 and provides digital control 41 to focus mechanisms of the handler 30 and the MUT. A high channel analog module 42 provides a fast analog capability to allow analog signals from the MUT to be process quickly. Analog measurement signals of the MUT are connected to an analog measurement unit, which is coupled through the pin electronics that connect to the electrical contacts of the digital camera module under test (MUT).

The tester 33 provides adjustments to the MUT 43, which includes alignment in the test station and focus adjustments. A MUT with manual focus adjustment capability is contacted with a mechanical focus adjustment unit in the handler. This mechanical focus adjustment unit makes physical contact with the lens cap of the MUT and turns the lens cap to obtain an optimal focus. The tester controls a stepper connected to the mechanical focus adjustment unit to turn the adjustment cap in one direction and then another, stopping at the best focus setting.

Test pictures are taken by the MUT while aligned in the optical unit within the test station 31. The processing of the test pictures is done by a picture-processing unit 44, which contains a plurality of parallel processors, each operating on a different portion of the test pictures. The number of parallel processor can be any number N, and N=4 is the preferred number of the present invention to compute picture parameters pertaining to the ability of the MUT to meet specifications and within the allotted fast test time. The picture parameters include: focus color and color sensitivity, infrared sensitivity, dark current, saturation, noise, bad pixels, pillowing and other distortion tests. The parameters requiring extensive computation are computed using the N parallel processors, each operating on a different portion of the test picture taken by the digital camera module under test.

Software algorithms 45 contained in the tester 33 are used to split the test pictures obtained from the MUT into sections, control the light source and control the focus of the MUT. The split sections are then coupled to the N parallel processors to be analyzed. Each of the N parallel processors operates on a different section in parallel. A software algorithm controls the focusing of the MUT and the positioning of the test targets located above the MUT in the test station 31. Another algorithm controls the light source, which contains blue, red, green and infrared colors, selecting a color, intensity and flicker rate.

Figure 3:
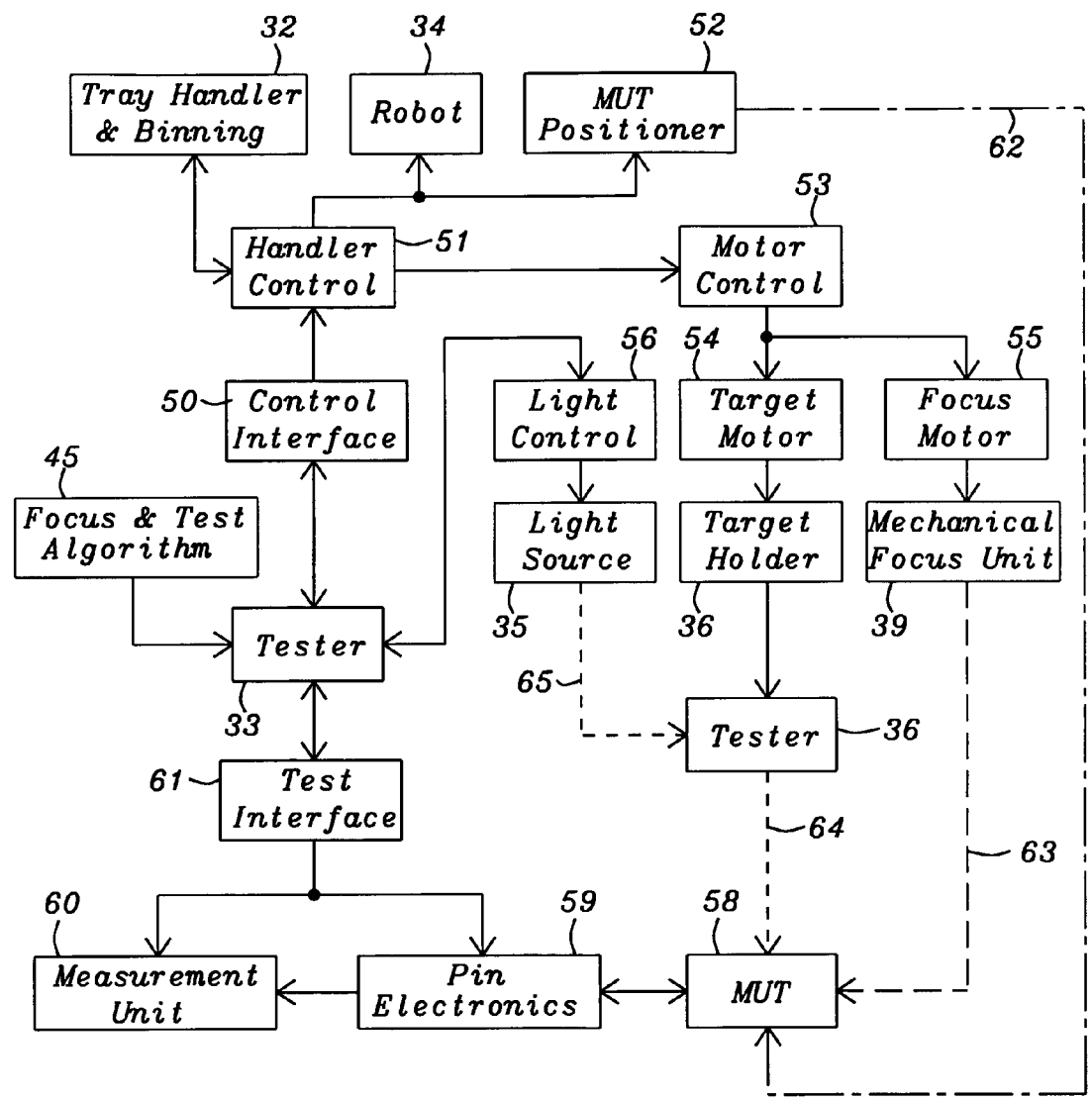
FIG. 3 is a block diagram of the test system of the present invention.

In FIG. 3 is shown a block diagram of the test system control of the present invention. The Focus and test algorithms 45 provides the instructions for the tester 33 to set up the MUT 58 in the test station, apply test conditions and receive back the test results. The tester 33 through a control interface 50 to the test station 31 in the handler 30 provides handler control 51 to the tray handler and binning (the sorting into part number bins) 32. The tray containing a plurality of digital camera modules is moved into position at an alignment mark near the robot 34. The robot 34 selects a digital camera module from the tray and places the digital camera module into a test station. A MUT positioner 52 under the control of the tester 33 positions 62 the selected digital camera module (MUT) into alignment with the optics system and the electrical contactor of the test station 31. The MUT is then clamped into place, and a signal contactor in the test station then contacts to the signal leads of the MUT.

The tester 33 through the control interface 50 and the handler control 51 provides a motor control 53 to control the target motor 54 to position focus targets 29 located in the target wheels 36 over the MUT 58 adjusting the distance of the targets 29 from the MUT. The focus motor 55 is then controlled to turn the lens cap of a MUT 58 having a manually adjustable focus. The focus motor 55 steps the mechanical focus unit 39, which is in contact 63 with the lens cap of the MUT 58 in a series of successive steps around the best focus point of the MUT 58, stopping when the best focus has been achieved.

The targets 29 comprise a metal mask with holes, preferably round, in which the hole and non-hole area of the target is approximately equal. The holes provide a light area to the view of the MUT 58 and the non-hole area provides a dark area. Different targets at different optical distances from the MUT have different sized holes.

Continuing to refer to FIG. 3, the tester 33 controls a light control unit 56 within the test station 31 to select brightness, color and flicker rate of the light source 35. The light colors include blue, red and green and infrared. The light source 35 is positioned above the targets 29 contained within the target wheels 36 and aluminates 65, 64 the MUT 58 through the targets 36. When a target is not required, as with testing light sensitivity, color cross talk and noise, the focus targets 29 are moved out of position so that the light source directly illuminates 64, 65 the MUT 58.

The tester 33 applies electrical signals to the MUT 58 through the test interface 61 and the pin electronics 59 using a two wire 12C microelectronics serial bus and receives data responses back from the MUT 58 through the pin electronics 59, the measurement unit 60 and the test interface 61. The data fed back from the measurement unit 60 ranges from results of DC measurements to pictures taken by the MUT 58 in response of the MUT to the applied of light, including no light. The measurement unit 60 is used to measure an analog picture signal to detect, for instance, maximum brightness of a picture that indicates an optimum focus setting of a MUT and pixel sensitivity to a light.

Figure 4:
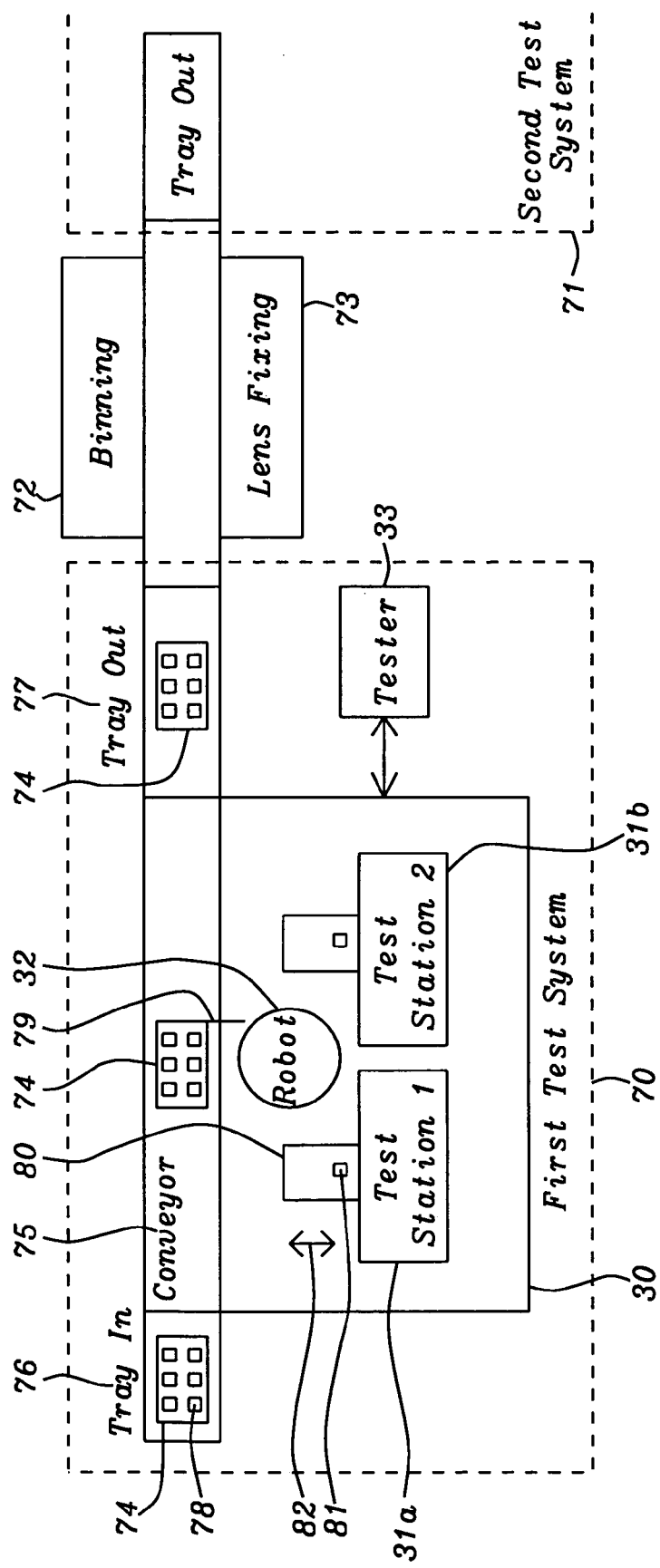
FIG. 4 is a diagram of the present invention for the handling of the digital camera modules.

FIG. 4 is a diagram of the present invention showing a floor plan of the handler 30 located within a first test system 70 and connected to a tester 33. A location of second test system 71 is shown connected to the binning 72 and lens fixing 73 areas used by the first test system. A plurality of metal trays 74 is used to transport digital camera modules through the handler 30. This allows the loading of untested modules at the "tray in" location 76 and the processing of the tested modules at the "tray out" location 77 in parallel with the testing of the module located at the alignment mark 79.

The metal tray 74 containing a plurality of digital camera modules 78, which are accurately positioned, is placed on a conveyer 75 at a "tray in" location 76 and is moved to an alignment location 79 on the conveyor near the robot 32. The digital camera modules contained in the tray 74 are placed in designated locations 78, accurately aligned on then tray 74 and oriented such that the robot 32 can select a digital camera module from the tray and place the module into a location 81 in a test fixture 80 of a test station 31a and 31b.

The handler 30 has two test stations 31a and 31b and the robot 32 selects a digital camera module from the tray 74 and places the module into the test fixture 80 of one of the test station 31a that is not being used to perform test while testing is being performed on another digital camera module in the other test station 31b. The digital camera module is optically aligned and clamped in place on the test fixture. The test fixture 80, aligned 82 with the optics contained in the test station, waits completion of testing of a second digital camera module in the second test station. Upon completion of tests on all of the digital camera modules 78 contained within a tray 74, the tray is moved to the "tray out" area 77 where the manually adjustable lens on modules that have passed the test criteria are physically fixed into place in the lens fixing area 73, comprising the use of glue or other methods of fixing the lens focus such as the use of a laser that fixes the lens cap to the module body. The modules are then sorted into pass or fail, including different categories of pass in the binning area 72. If the digital camera modules contained on the tray have a fixed focus, the modules bypass the lens fixing and are sorted according to the test results in the binning area 72. The binning operation can be accomplished by a software identification that leaves the tested digital camera module in the tray 74 or the digital camera modules can be unloaded into part number bins in the binning area. The use of multiple trays allows untested digital camera modules to be loaded into a tray 74 at the "tray in" area 76, while modules 78 in a tray position at the alignment mark 79 are being tested and modules 78 in a tray positioned at the "tray out" area 77 are processed for lens fixing and binning.

Figure 5:
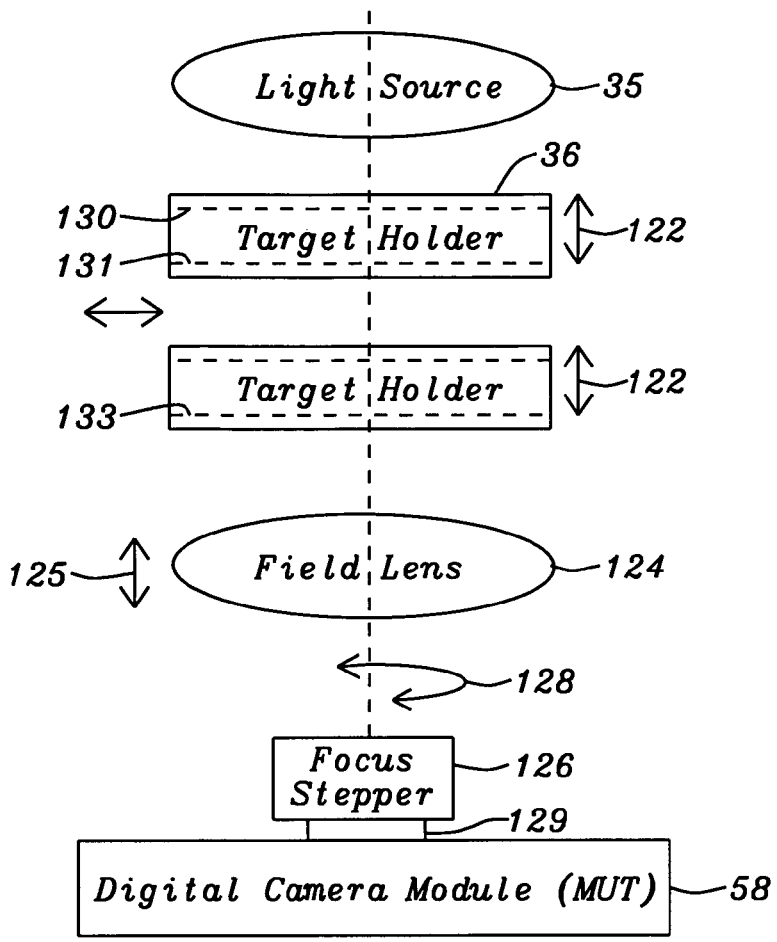
FIG. 5 is a diagram of the optical system used in the test of digital camera modules of the present invention.

The optical system contained in each test station 31a and 31b of the present invention is shown in FIG. 5. The digital camera module under test (MUT) 58 is shown aligned under a field lens 124, target holders 36 and a light source 35. The field lens 124 is position adjusted 125 so as to make the targets contained in the target holders 36 appear to have a distance (virtual distance) from the MUT that is different than physically exists in the test station. The virtual distance that can be established ranges from the closest focal length of the MUT to the longest photographic distance, called infinity. There are two target holders 36 each of which can hold two targets 130 and 131. Each target comprises a pattern of light and dark areas, such as could be created with a metal mask for example. One target 130 in each target holder 36 is located near the upper surface of the target holder and a second target 131 is located near the lower surface on each target holder 36. Thus there are four targets that can be positioned over the MUT simultaneously. It is within the scope of the present invention that more than two target holders 36 can be used, each containing an upper surface target 130 and lower surface target 131. It is also within the scope of the present invention that multiple target images can be made within one target, which could increase the number of targets without increasing the number of target holders, or reduce the number of physical targets needed.

Continuing to refer to FIG. 5, both target holders 36 can be moved closer or further from the field lens 124 and the MUT 58, which adjusts the virtual distance of the targets from the lens of the MUT. When the targets are no longer needed in the focus and test sequence, the target holders 36 are moved 123 to remove the targets from above the field lens 124. The light source 35 comprises four light colors created by light emitting diodes (LED) and producing a colored light for red, blue, green and infrared. Using an appropriate combination of the light colors, a white light can be produced. A photo diode is used to establish and maintain calibration of the light source, and the light source 35 is controlled for brightness and has a fast on and off transition. When the target holders 36 that contain the focus targets are properly positioned, the focus stepper 126, which physically contacts the lens cap 129 of a manual focus MUT 58, turns 128 the lens cap of the MUT 58 until an optimal focus is determined. The focus stepper 126 turns the lens cap first in one direction, then in the reverse direction in successively finer steps around the optimal focus point until the best focus is determined. At the best focus point position of the manually adjustable lens, the lens cap is left in place until the MUT exist the test handler 30 at which point the focus is permanently set in the lens fixing area 73.

Continuing to refer to FIG. 5, The targets 130 and 131 located in the target holders 36, are positioned such that a plurality of targets ranging from a target for the closest focal length to that of the furthest (infinity) are positioned over the MUT simultaneously, and a picture is taken by the MUT 58 of the plurality of targets 103 and 131 in one picture and analyzed for focus. The best focus is determined when there is a maximum brightness between light and dark areas on the image of each of the plurality of targets. Multiple focus pictures are taken during the focus operation of a MUT 58 having an adjustable focus. Each picture is quickly analyzed to determine if the optimal focus point has been obtained. This determination of the optimal focus point comprises determining a maximum contrast between light and dark areas of the targets, and results in a maximum brightness between the light and dark areas of the targets when the MUT is in focus. Each picture taken during the focus operation contains a composite image of all the targets that are positioned over the MUT so that a full range of focus is captured by each focus picture taken and is subsequently analyzed in the measurement unit 60.

Continuing to refer to FIG. 5, if the MUT 58 has an automatic focus capability, a electrical signal from the tester is applied to the automatic focus MUT, which controls the lens focus mechanism of the MUT. The electrical focus signals applied by the tester control the lens to determine that the MUT 58 can produce the full range of focus from the closest focal length to optical infinity. The targets 130 and 131 located in the target holders 36, are positioned 122 and 123 such that a plurality of targets ranging from a target for the closest focal length to that of the furthest (infinity) are positioned over the MUT and a resulting picture is taken by the MUT 58 of the plurality of targets 130 and 131, and analyzed for maximum brightness between light and dark areas of the targets.

Continuing to refer to FIG. 5, if the MUT 58 is a fixed focus device, targets 130 and 131 in the target holders 36 are positioned 123 over the MUT 58, and with the adjustment 125 and 122 of the field lens 124 and the target holders 36, the closest and furthest focal length of the fixed lens MUT is established. Then a picture is taken, which contains an image of all the targets 130 and 131 that have been positioned over the MUT. A picture, which contains the images of the multiple targets, is analyzed by the measurement unit 60 to determine if the fixed focus MUT 58 meets the focus specification of the fixed focus MUT.

Figure 6:
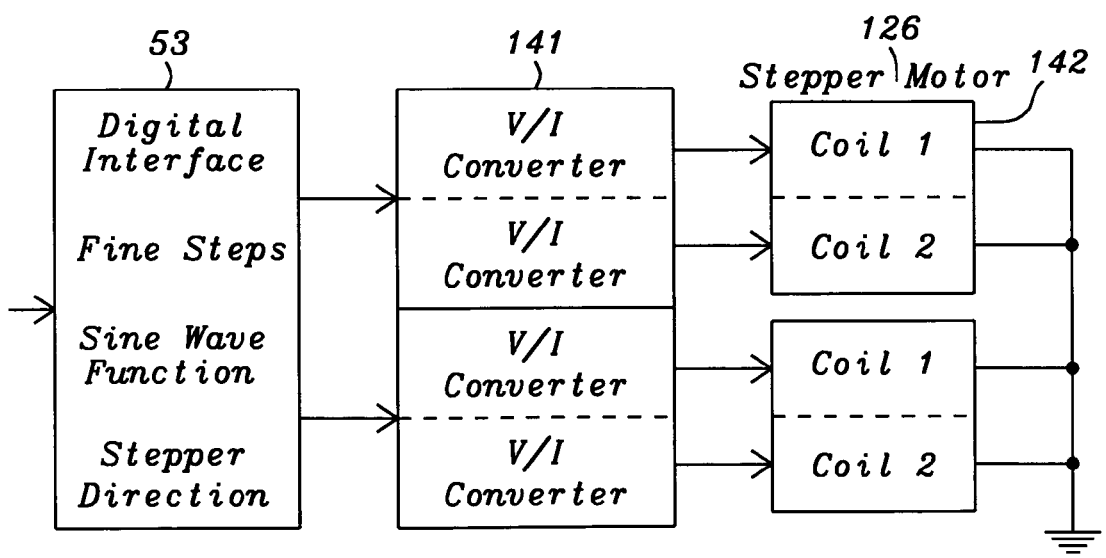
FIG. 6 is a block diagram of the stepper motor control used in the test system of the present invention.

In FIG. 6 is shown a block diagram of the present invention of the stepper motor control used for the target motor 54 and the focus motor 55 (FIG. 3). The motor control 53 has a digital interface that can be formed by a field programmable gate array (FPGA), or from a computer I/O card, that provides a digital signal and control to a DAC (digital to analog converter) that has as an output current resulting from a the DAC output coupled to a voltage to current (V/I) converter 141. The DAC, as an example, can have, but is not limited to, an eight bit digital input that results in the output current from the V/I converter, and the DAC is controlled by PWM (pulse width modulation) The current from the V/I converters controls the coils 142 of the stepper motors 54 and 55 used for target positioning and focusing the MUT 58 shown in FIG. 5. It should be noted that an alternative to the stepper motors 54 and 55 (FIG. 3) is the use of regulated linear motors to improve adjustment speed. The stepper motor 126 is stepped with fine increments having a minimum of approximately 24 steps for the full range of the focus stepper motor 126. The current applied to the stepper motor 126 is in the form of a sine wave for to provide a smooth noise free adjustment. The motor control 53 provides digital signals to the DAC that allows the stepper direction to be reversed. For example, as the images captured by the MUT of the focus targets 130 and 131 go through a maximum brightness (maximum contrast between the light and dark areas), the focus of the MUT 58 is adjusted past the best focus point. When this happens, the stepper motor direction is reversed, and the stepper motor 126 is stepped with successively smaller increments back and forth past the best focus point until the focus images exhibit a focus point that is within the specification of the MUT 58.

Figure 7:
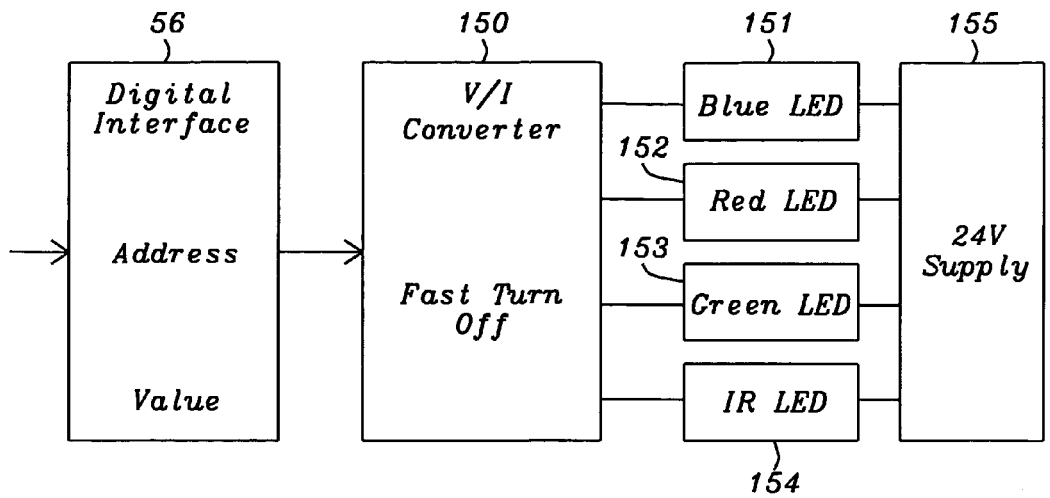
FIG. 7 is a block diagram of the light control used in the test system of the present invention.

FIG. 7 shows a block diagram for the light control 56 of the present invention. A digital interface, which can be an FPGA or discrete logic, is coupled to a voltage to current (V/I) converter 150 (one for each light color) to produce the required brightness of each light color. A plurality of light colors is available to test the digital camera module of which the configuration of FIG. 7 is an example. Additional colors are available to satisfy the test requirements. An address is provided that allows the selection of one, or any combination of the light colors. The different colored lights (blue 151, red 152, green 153 and IR (infrared) 154) are each generated by a serial string of a plurality of LED devices connected in series to a 24V supply 155. Each color string of LED devices is biased and controlled in such a way as to allow a fast and complete turn off when a particular light color (LED color string) is turned off so as not delay or contaminate the subsequent testing with unwanted light.

Figure 8:
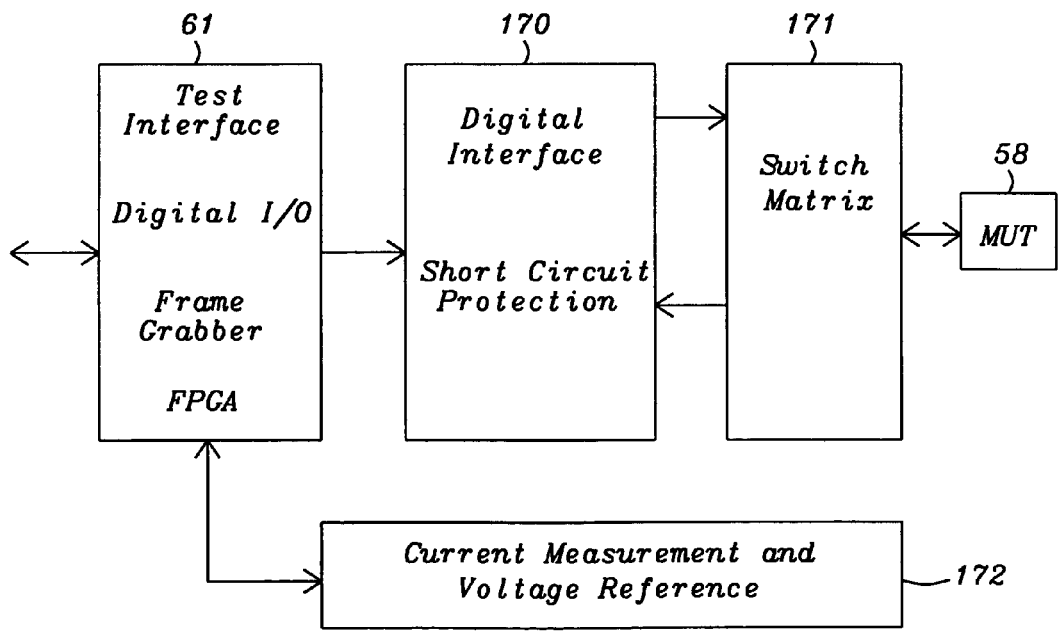
FIG. 8 is a block diagram showing the electrical test interface to the digital camera module of the present invention.

In FIG. 8 is shown a block diagram of the present invention for the pin electronics 59 and the measurement unit 60. The test interface 61 provides an interface to the computer system contained within the tester 33 and can be implemented using a field programmable gate array FPGA. Digital signals are passed through the digital I/O of the test interface 61 to and from the digital camera module MUT 58. A frame grabber, which is resident in the computer system in the tester, synchronizes the light source, controls the taking of a test picture and loads a different portion of the test picture taken by the MUT 58 into each of the parallel processors. The clock rate of the frame grabber ranges between 13 and 26 MHz and is determined by the clock of the MUT 58. A digital interface 170 containing a buffer provides short circuit protection for the test interface 61 and connects digital signals to the MUT 58 through a switch matrix 171, which comprises either relays or analog switches. The switch matrix 171 is controlled by the tester 33 and separates the digital and analog test functions that are applied to the MUT 58. When DC tests are applied to the signal I/O of the MUT, the switch matrix connects an analog measurement network 172 to the MUT, and disconnects the analog measurement network 172 when picture signals are being processed. The analog measurement network provides reference voltages to produce current measurements performed on the I/O pins of the MUT 58.

Figure 9A:
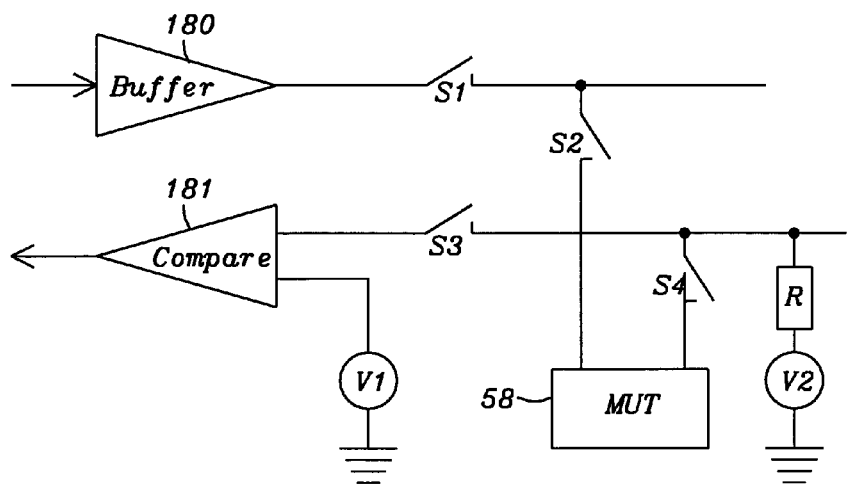
FIG. 9A is a circuit diagram of the pin electronics of the present invention connected to the digital camera module to provide parameter measurements.

FIG. 9A shows a portion of the pin electronics of the present invention. A relay matrix designated by switch symbols S1, S2, S3 and S4 connects to the I/O pins of the MUT. Digital signals are applied to the MUT 58 through relays S1 and S2. The analog measurement network is connected to I/O pins of the MUT 58 through relays S3 and S4. A buffer circuit is used to provide short circuit protection to the test interface 61. A comparator 181 provides a digital signal to the tester depending on the results of a current measurement that is made on an I/O pin of the MUT when relays S3 and S4 are closed. A reference voltage V1 is set to a voltage value, which will trigger the comparator when voltage drop across the resistor R and the reference voltage V2 exceed a test limit for the I/O pin of the MUT 58 that is connected relay S4.

Figure 9B:
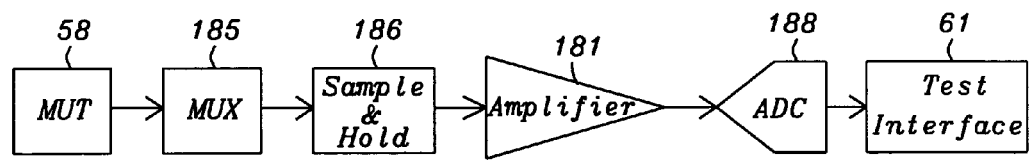
FIG. 9B is a block diagram of circuitry contained within measurement unit of the present invention to make analog image measurements of the present invention.

FIG. 9B demonstrates a portion of the measurement unit 60 where analog picture signals from the MUT 58 are coupled to a sample and hold circuit 186 through a multiplexer MUX 186. An amplifier 187 with variable gain couples the output of the sample and hold circuit 186 to an analog to digital converter for transmission to the tester 33 through the test interface 61. Such digital camera module parameters as brightness used in the focus test and pixel sensitivity to being illuminated by the light source are measured using analog picture signals from the MUT 58. The sample and hold circuit, for example, allows for the capture and transmission of the results of a particular focus adjustment while the next focus adjustment is being made in search for the optimum focus setting. The brightness of the analog picture signal from the MUT 58 is used to detect the optimum focus setting.

Figure 9C:
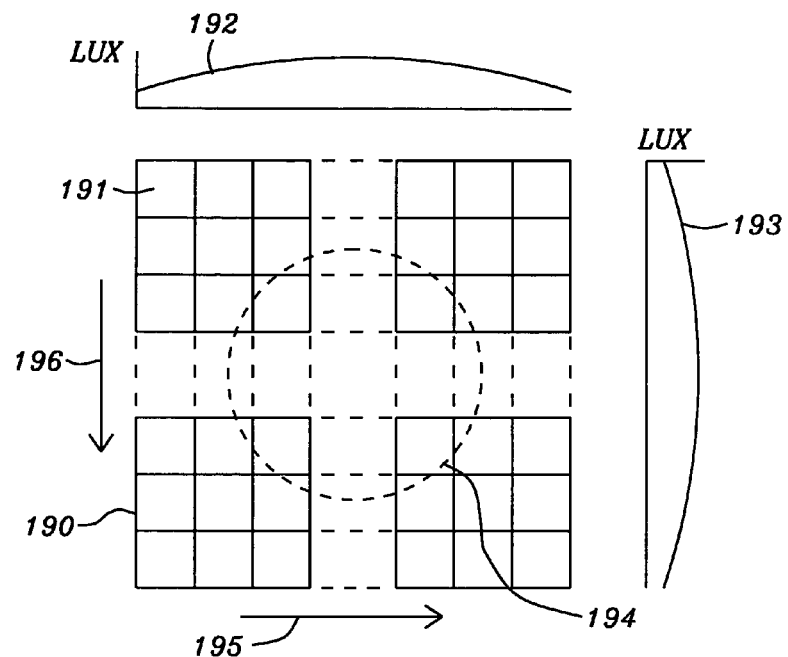
FIG. 9C is a diagram of the present invention showing pixels on a light sensitive chip and a distribution of light intensity on the various pixels.

In FIG. 9C is shown a light sensitive semiconductor device 190 with rows and columns of light sensitive elements (pixels) 191. The distribution of light falling 192 and 193 on the device 190 is shown in LUX, a unit of illumination equal to one lumen (a unit of light) per square meter. There is a lower amount of light falling on each pixel at the ends of the rows 192. Similarly there is a lower amount of light falling on each pixel at the ends of each column 193. The two distributions 192 and 193 result in the center area of the light sensitive device 190 receiving the greatest amount of, as shown by the circular area 194. Pixels of the light sensitive device 190 are scanned out to the circuitry of the analog-measuring unit shown in FIG. 9B by row 195 so that the pixel sensitivity to light can be measured. The pixel sensitivity can also be measured by scanning out columns of pixels 196. The direction 195 of the scanning of rows can be left to right or right to left. Similarly, the direction 196 of the scanning of rows can be top to bottom or bottom to top. Response of the pixels to each of the colors of the light source 35, which comprises red, blue, green and infrared, are measured using the analog measuring unit 60. Weak and dead pixels are detected along with the ability of a pixel to reject infrared.

Figure 10:
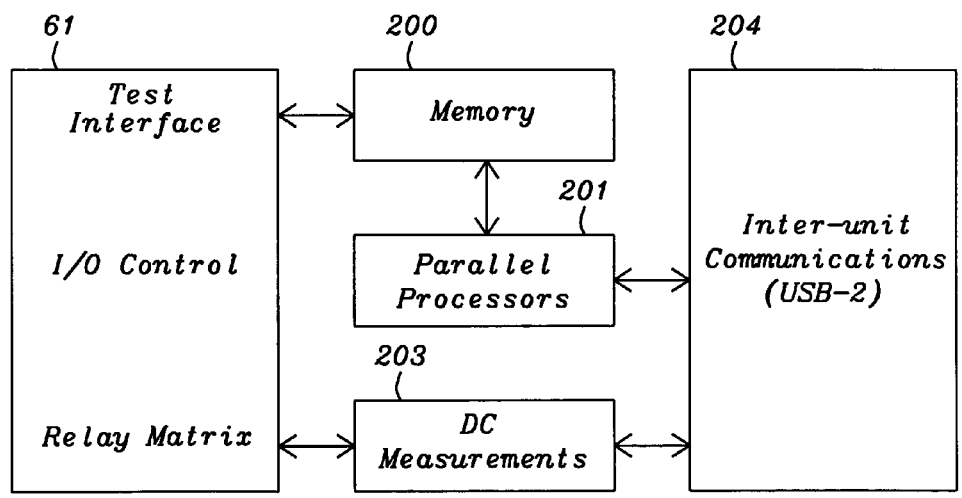
FIG. 10 is a block diagram of the computational unit within the tester of the present invention.

FIG. 10 shows a block diagram of the computational unit of the present invention that is located in the tester 33. The tester interface 61 provides I/O control of the MUT 58 and selection of the relay matrix in the pin electronics 59 to select either DC measurements 203 performed in the measurement unit 60 or extensive analysis of digital picture images taken by the MUT 58 to determine noise, bad pixel, color leakage between color portions of a pixel, dark current, vignettes, picture resolution and distortion through extensive computations. A frame grabber resident in the computer system of the tester connects digital test pictures taken by the MUT to the to the memory 200 associated with each parallel processors 201. Each of the parallel processors 201 and the associated memory 200 are assigned a portion of each test picture, which allows parallel processor 201 to make calculations in parallel on a portion of each picture that is placed into memory 200 by the frame grabber. The parallel processors and the DC measurements are linked together through a high-speed inter-unit communication bus (USB-2).

Figure 11A:
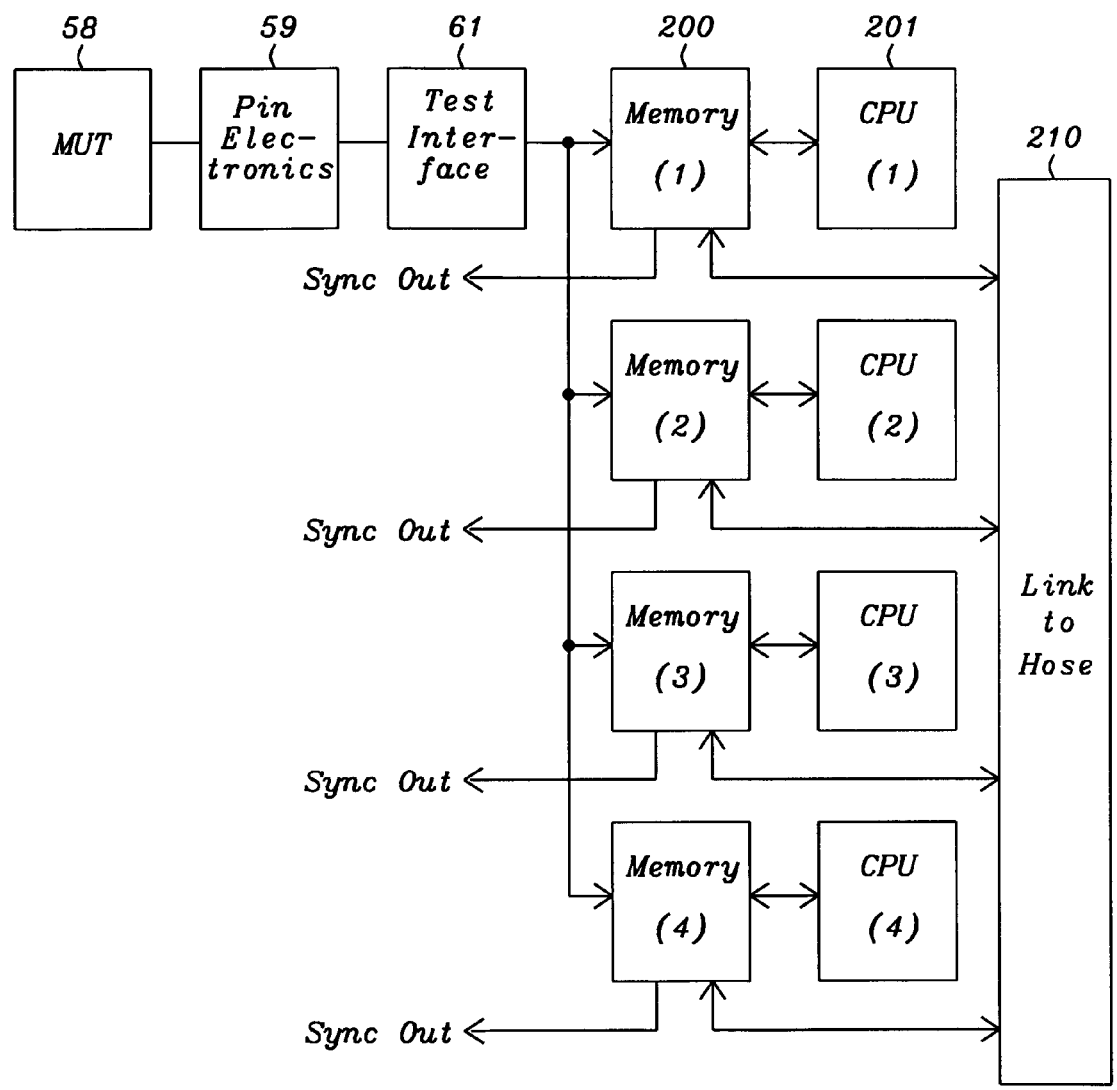
FIG. 11A is a block diagram of the parallel processing used to compute picture parameters of the digital camera module under test of the present invention.

FIG. 11A shows a block diagram the computational unit of the tester containing parallel processors 201 (CPU (1), CPU (2), CPU (3) and CPU (4)) and the associated memory 200 (Memory (1), Memory (2), Memory (3) and Memory (4)) used to make computations on digital test pictures taken by the MUT (digital camera module under test) 58. The test interface 61 and the pin electronics 59 couple the MUT to the memory 200. Four processors 201 operate in parallel to compute picture parameters to determine the capability of the digital camera module MUT 58 to meet specifications. It should be noted that the number of parallel processors 201 is not limited to four, and the number can be larger or smaller depending upon the requirements of the MUT 58 and of the test system.

A frame grabber loads each memory 200 with a portion of the test picture taken by the MUT 58. The Sync Out of each memory is synchronized with the clock of the MUT to allow each portion of a test picture to be loaded into the memory. Once a portion of a picture has been loaded into a memory 200, the CPU 201 associated with the memory starts a series of computations to determine such picture parameters as noise, bad pixel, color leakage between color portions of a pixel, dark current, vignettes, picture resolution and distortion. The computations comprise the use of fast Fourier transform to analyze the picture parameters of the test picture that are loaded into memory 200 by the frame grabber. The frame grabber is also used to test the ADC 188 (FIG. 9B), whereby a known analog image input to the ADC is checked against the digital output that is stored into memory 200.

Since one picture image does not capture the information necessary to compute all picture parameters, a plurality of test pictures are taken by the MUT, for example, a test picture must be taken for each of the four colors of light, blue, red, green and infrared as well as no light. Extensive computations are required on each test picture at the pixel level to determine the picture taking capability of the MUT 58. Using a plurality of CPU's 201 allows the computation time to be reduced by approximately the number of processors 201 since each processor is operating on picture data independent from that of the other processors. Each memory 200 is linked to a host 210 to allow computed test results to be brought together and allow binning of the MUT after completion of testing of all digital camera modules contained within a tray.

Figure 11B:
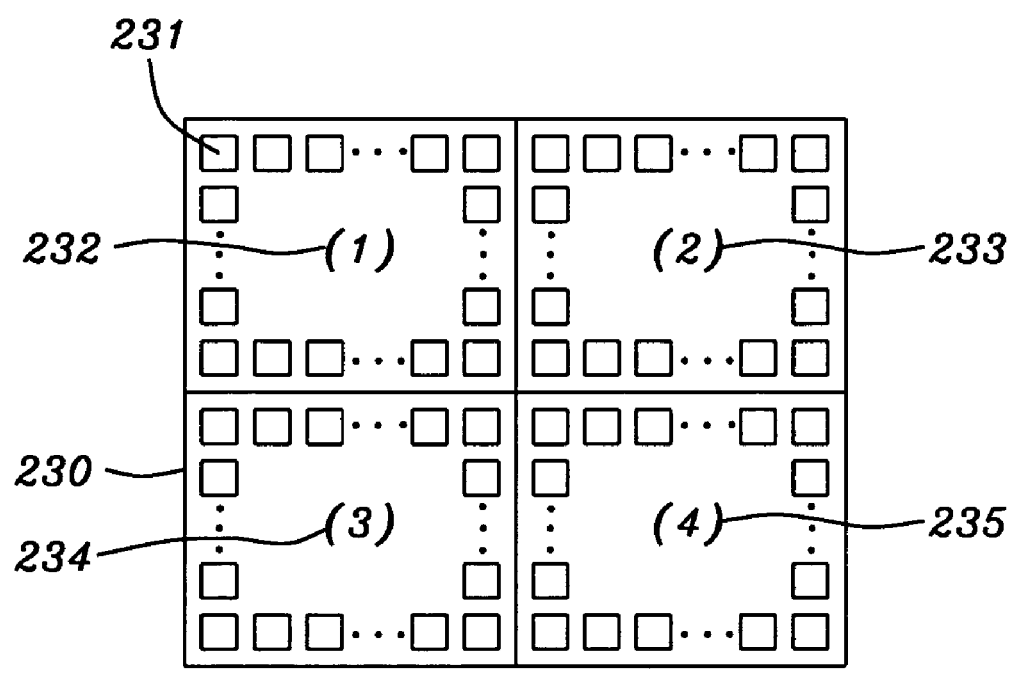
FIG. 11B is a diagram of the partitioning of a test picture of the digital camera module of the present invention for analysis by the parallel processors.

In FIG. 11B is shown a test picture 230 of the present invention taken by the MUT 58 and containing a large number of pixels 231. The picture 230 is partitioned into four parts 232, 233, 234 and 235. Each of the partitioned parts of the test picture 230 is stored into a different memory 200. As an example, test picture partition (1) 232 could be stored into memory (1), partition (2) 233 stored into memory (2), partition (3) 234 stored into memory (3) and partition (4) 235 stored into memory (4). The partition example shown in FIG. 11B is for illustrative purposes only and any partition configuration can be used that satisfies the requirements of the particular test and the test system. Once the picture partitions are stored into separate memories 200 the respective CPU 201 operates on the picture partitions in parallel. For instance, CPU (1) operates on partition (1) 232 stored in memory (1) in parallel with CPU (2) operating on partition (2) stored in memory (2), in parallel with CPU (3) operating on partition (3) stored in memory (3), and in parallel with CPU (4) operating on partition (4) stored in memory (4). The computation time of the total test picture 230 is reduced by approximately the number of CPU's 201 because the picture data of each partition 232, 233, 234 and 235 is not shared between the computational units, CPU's (1), (2), (3) and (4) 201 and the associated memories (1), (2), (3) and (4) 200.

Figure 12:
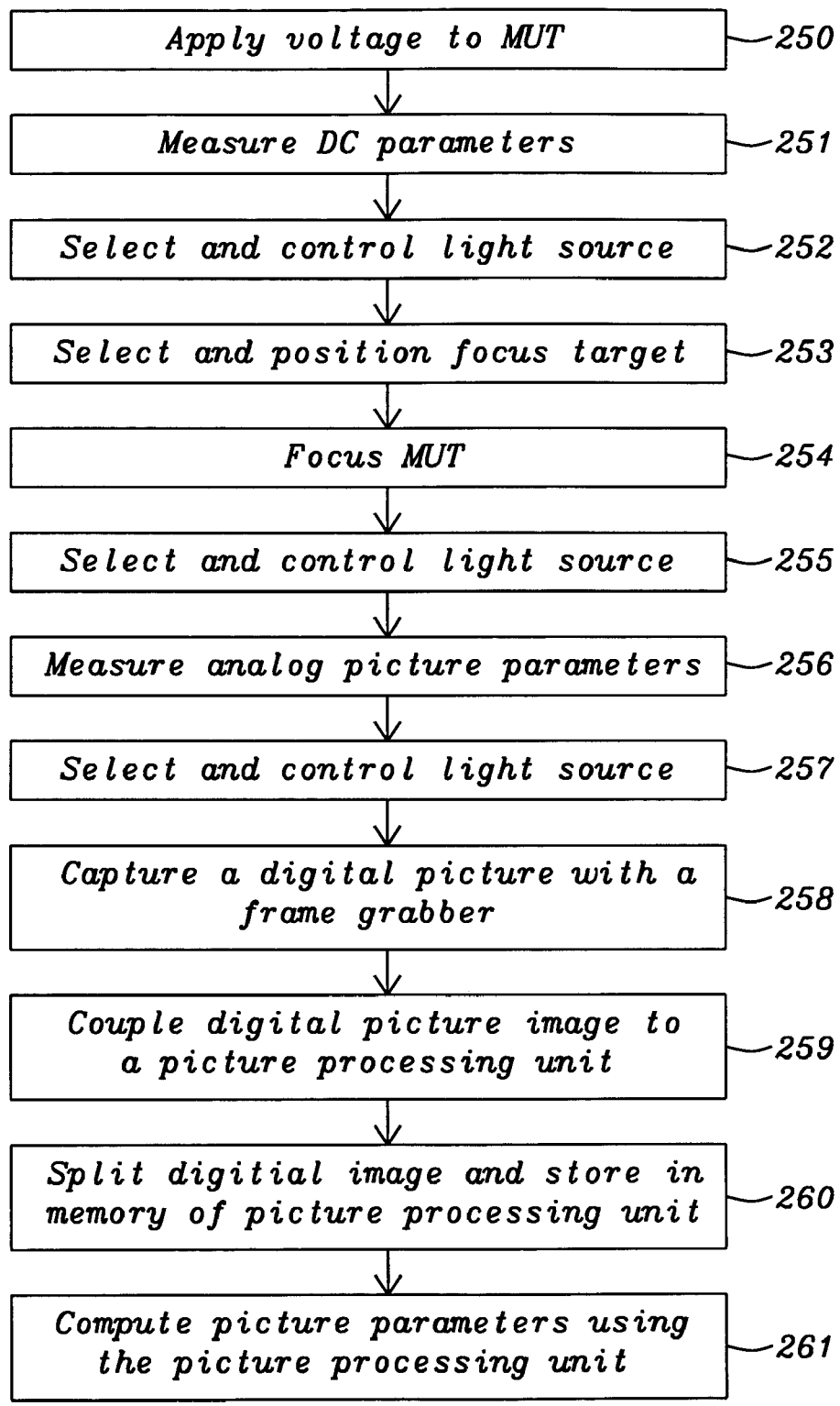
FIG. 12 is a flow diagram of the focus and test process of the present invention.

In FIG. 12 is a flow diagram of the focus and test of digital camera modules. Once the digital camera module under test (MUT) 10, 13, 17 and 19 (shown in FIG. 1) has been loaded into a test station 31 of the handler 30 and electrical contact has been made to the electrical leads of the MUT, voltages are applied to the MUT 250. DC parameters, comprising continuity, shorts and temperature of the MUT, are measured 251. The light source is selected and controlled 252 to produce a light color and intensity. A focus target is selected and positioned within the view of the MUT 253. The target contains a focus pattern of light and dark areas. The pattern shape can be rounded, rectangular, or of other shapes that create light and dark areas. The selection of a target is determined by the optical distance of the target from the MUT and has a focus pattern dependent upon the optical distance of the target from the MUT. A target motor under control of the tester adjusts the optical distance from the MUT of the selected target, and the MUT is focused 254 by controlling the focus motor. A brightness of an image from the MUT is connected to the analog measuring unit and the results are fed back to the tester from which the tester uses to control the focus motor to focus the MUT. The focus motor is adjusted to produce a maximum image brightness, at which point the MUT is focused. The focus of the MUT is left in place through the remaining testing.

Continuing to refer to FIG. 12, once the MUT has been focused 254, the light source is selected and controlled 255 by the tester to produce a color and brightness, and analog picture parameters are measured 256 using the analog measuring unit. Pixels of the analog picture of the MUT are scanned out by pixel rows or columns as shown in FIG. 9C. The results of the analog measurements are fed back to the tester 33 using the test interface 61. Different colors and brightness of the light source are used to test the sensitivity of the pixels to different colors of light.

Continuing to refer to FIG. 12, the light source is selected and controlled 257. A frame grabber controls the capture of a digital picture by the MUT 258. The frame grabber synchronizes the light source with a clock of the MUT to capture the digital picture. The light source is controlled to turn the LED devices producing the light on and off rapidly and the frame grabber synchronizes the rapid on-off cycle of the light source with the clock of the digital camera module. The digital picture image is coupled to a picture-processing unit 259 located within the tester under the control of the frame grabber. The frame grabber splits the digital image and stores the split image into the memories of the picture-processing unit 260. The picture-processing unit contains N-parallel processors. Each of the N-parallel processors is coupled to an independent memory. The independent memories coupled to the N-parallel processors comprise the memory of the picture-processing unit. Each independent memory receives a different portion of the split digital image. The N-parallel processors each operate on an independent portion of the digital image split by the frame grabber 261. The parallel processor operation on the digital image in split sections allows the computation time to be reduced by approximately the number of parallel processors that are used, since the serial processing time primarily comprises the loading of the memory of the picture processing unit.

While the invention has been particularly shown and described with reference to preferred embodiments thereof, it will be understood by those skilled in the art that various changes in form and details may be made without departing from the spirit and scope of the invention.

What is claimed is:

1. A test system for testing of digital camera modules, comprising:
 a) a tester containing a computer system and software algorithms for control and test of a digital camera module (MUT),
 b) a test handler for handling said MUT during test;
  a tray handler,
  a robot,
  a plurality of test station, each comprising;
   a light source,
   at least one target wheel,
   a field lens,
   a contact unit,
   a focus unit,
 c) said tester controls said test handler to transfer the MUT, using said robot, from a tray within said tray handler to the contact unit of said test stations, wherein a focus, an electrical test and an optical test are performed on said MUT,
 d) said contact unit makes electrical contact to said MUT and positions said MUT under an optical unit comprising said light source to illuminate the MUT, and said target wheel in conjunction with said field lens and said focus unit to focus said MUT, and
 e) said computer system analyzes pictures taken by said MUT during test.

2. The test system of claim 1, wherein said plurality of test stations is two.

3. The test system of claim 1, wherein said robot selects said MUT from the tray and positions the MUT into the test stations.

4. The test system of claim 1 wherein said tester controls said light source.

5. The test system of claim 4, wherein control of said light source comprises color, brightness and flicker.

6. The test system of claim 5, wherein said color comprises red, blue, green and infrared.

7. The test system of claim 5, wherein said brightness includes the absence of any light.

8. The test system of claim 5, wherein said flicker allows test of said MUT for sensitivity to a light source of a varying intensity.

9. The test system of claim 1, wherein said field lens is positioned between said MUT and the target wheel containing a plurality of focus targets to make said focus targets appear to the MUT to be at a different distance from the MUT than physically exists.

10. The test system of claim 9, wherein the position of the target wheel is controlled by the tester to make focus targets appear to the MUT to be located at the shortest focal length of said MUT up to and including the furthest focal length of the MUT.

11. The test system of claim 10, wherein the furthest focal length of the MUT is optical infinity.

12. The test system of claim 9, wherein said target wheel contains a plurality of focus targets within optical view of the MUT.

13. The test system of claim 9, wherein said tester controls the position of said target wheel, which further comprises:
 a) a selection of targets,
 b) a position of said selection of targets contained in said target wheels within an optical view of said MUT.

14. The test system of claim 1, wherein said contact unit, comprises:
 a) a holder for said MUT,
 b) probes for contact to the electrical leads of said MUT,
 c) pin electronics for coupling electrical signals to and from the MUT,
 d) a relay matrix for selecting test conditions.

15. The test system of claim 14, wherein said relay matrix selects DC conditions for performing DC tests on signal pins of electrical leads of said MUT.

16. The test system of claim 15, wherein said DC tests comprise electrical shorts between leads of the MUT, continuity of said leads and temperature of said MUT.

17. The test system of claim 14, wherein said pin electronics couples said electrical signals from the MUT to a measurement unit.

18. The test system of claim 17, wherein said measurement unit measures analog test signals from the MUT.

19. The test system of claim 18, wherein said analog test signals include analog image signals.

20. The test system of claim 1, wherein said tester controls said focus unit to focus said MUT, which is positioned under targets contained in said target wheel.

21. The test system of claim 20, wherein said focus unit further comprises a physical contact to a manually adjustable lens cap of said MUT to adjust said lens cap to an optimum focus position.

22. The test system of claim 21, wherein said optimum focus position is left in place throughout subsequent testing and handling of said MUT.

23. A tester coupled to a handler for testing digital camera modules, comprising:
   a) a control unit
   b) a digital control module,
   c) an analog module,
   d) a picture processing unit,
   e) software algorithms,
   f) said control unit controlling the operation and set up of a handler having a plurality of test stations,
   g) said digital control module providing control signals to said digital camera module under test (MUT),
   h) said analog module measuring analog signals from said MUT,
   i) said picture processing unit for computing picture parameters from a digital picture image,
   j) said software algorithms providing control of:
      a light source in said handler,
      a focus operation on the MUT,
      a split picture images taken by the MUT.

24. The tester of claim 23, wherein said digital control module is connected to a pin electronics that is connected to electrical leads of said MUT, further comprises:
   a) a test interface connected to a pin electronics unit,
   b) a digital I/O to apply digital signals to said MUT and receive digital signals from said MUT,
   c) a frame grabber to synchronize said light source with taking said picture image by said MUT and transferring said picture image to said picture processing unit,
   d) a field programmable gate array (FPGA) to configure operation of said control unit.

25. The tester of claim 24, wherein said pin electronics unit further comprises:
   a) a digital interface to said MUT,
   b) a relay matrix for controlling electrical signals to and from said MUT,
   c) a voltage reference applied to I/O pins of said MUT,
   d) a current measurement of said I/O pin current,
   e) a short circuit protection to protect test circuitry from shorted I/O pins of said MUT.

26. The tester of claim 25, wherein said relay matrix selects between digital and analog testing of said MUT.

27. The tester of claim 24, wherein said digital I/O couples a digital signal to said MUT for the purpose of controlling the MUT, and couples digital picture images back from said MUT for analysis.

28. The tester of claim 24, wherein said frame grabber captures a test picture taken by said MUT and couples said picture to said picture processing unit.

29. The tester of claim 28, wherein said test picture is a portion of said picture taken by said MUT.

30. The tester of claim 28, wherein said frame grabber further comprises:
   a) a synchronization of said light source with a clock of said MUT,
   b) a turn on of said light at a start of the capture said test picture,
   c) a turn off of said light immediately upon completion of the capture of said test picture.
   d) a division of said test picture into a plurality of portions,
   e) a coupling of said plurality of portions to said picture processing unit.

31. The tester of claim 24, wherein said FPGA allows reconfiguration of said digital control module.

32. The tester of claim 23, wherein said analog module measures analog signals from the MUT, further comprises:
   a) DC test parameters of the MUT,
   b) analog image signals from the MUT.

33. The tester of claim 32, wherein said DC test parameters comprise:
   a) continuity of signal leads,
   b) DC current of said signal leads and power leads,
   c) temperature of the MUT.

34. The tester of claim 32, wherein said analog image signals allow measurement of an image parameter.

35. The tester of claim 32, wherein said image parameter comprises brightness used in focusing said MUT and pixel sensitivity.

36. The tester of claim 23, wherein said picture processing unit contains N-parallel processors, each processor of said N-parallel processors is associated with a memory that is loaded with a portion of a digital image by a frame grabber, whereby each said processor of said N-parallel processors compute picture parameters in a parallel operation on said portion of a digital picture image taken by the MUT.

37. The tester of claim 36, wherein said N-parallel processors are four.

38. The tester of claim 36, wherein said N-parallel processors reduce a time needed to make computations on a full image by approximately the number of processors used.

39. The tester of claim 23, wherein said control unit controls a stepper motor in said handler.

40. The tester of claim 39, wherein said stepper motor controls a focus adjustment of the MUT.

41. The tester of claim 23, wherein the control unit controls a position of focus targets over said MUT.

42. The tester of claim 41, wherein the control unit selects said targets to position over said MUT 43. The tester of claim 41, wherein control unit adjusts the distance of the targets from said MUT.

44. The tester of claim 23, wherein the control unit controls said light source of the handler.

45. The tester of claim 44, wherein said control unit selects a light color of said light source.

46. The tester of claim 45, wherein said light color is red.

47. The tester of claim 45, wherein said light color is blue.

48. The tester of claim 45, wherein said light color is green.

49. The tester of claim 45, wherein said light color is infrared.

50. The tester of claim 45, wherein said light source is controlled to produce no light.

51. A method of testing digital camera modules, comprising:

a) controlling a test handler with a tester to focus and test a digital camera module (MUT),
b) applying a voltage to said MUT,
c) measuring DC parameters,
d) selecting and controlling a light source,
e) selecting and positioning a focus target,
f) focusing said MUT,
g) measuring analog picture parameters from said MUT,
h) capturing a digital picture using a frame grabber,
i) coupling a digital picture image from said MUT to a picture processing unit,
j) splitting said digital picture into N-portions and storing said N-portions into memory of said picture processing unit,
k) computing picture parameters of said digital picture portions with said picture processing unit.

52. The method of claim 51, wherein said DC parameter is current.

53. The method of claim 51, wherein said DC parameter is continuity.

54. The method of claim 51, wherein said DC parameter is a temperature diode voltage.

55. The method of claim 51, wherein said light source is a light emitting diode (LED).

56. The method of claim 55, wherein said LED is a serial chain of a plurality of light emitting diodes of a color of light.

57. The method of claim 56, wherein said color is red.

58. The method of claim 56, wherein said color is blue.

59. The method of claim 56, wherein said color is green.

60. The method of claim 56, wherein said color is infrared.

61. The method of claim 56, wherein said light source is a combination of red, blue and green colors.

62. The method of claim 51, wherein said light source is turned off.

63. The method of claim 51, wherein said light source is turned on and off with a speed that prevents contamination of subsequent testing with unwanted light.

64. The method of claim 51, wherein said light source is synchronized with a clock of said MUT controlling a capture of a digital picture.

65. The method of claim 51, wherein said target has a pattern of light and dark areas.

66. The method of claim 65, wherein said pattern has a size dependent on an optical location of the target from said MUT.

67. The method of claim 51, wherein positioning said target uses a stepper motor to adjust a physical distance of the target from said MUT and a field lens to adjust an optical distance the target from said MUT.

68. The method of claim 51, wherein focusing said MUT uses a stepper motor to turn a lens cap of a manually adjustable MUT to obtain a picture with a maximum brightness of an image of said target.

69. The method of claim 68, wherein said MUT is in focus when an analog picture of said target taken by the MUT has maximum brightness.

70. The method of claim 51, wherein measuring analog picture parameters of said MUT uses an analog measurement unit to measure an intensity of pixels forming said analog picture.

71. The method of claim 70, wherein said pixels are scanned out of said MUT by row.

72. The method of claim 70, wherein said pixels are scanned out of said MUT by column.

73. The method of claim 51, wherein said frame grabber synchronizes a capture of the digital picture image by said MUT with a turn on and turn off of said light source.

74. The method of claim 51, wherein splitting of said digital picture into portions and storing into memory of said picture-processing unit is controlled by a frame grabber.

75. The method of claim 51, wherein said picture-processing unit comprises N-parallel processors and N-memories.

76. The method of claim 75, wherein each parallel processor of said N-parallel processors is separately coupled to a memory of said N-memories.

77. The method of claim 75, wherein a picture portion of said N-portions is connected to a memory of said N-memories using said frame grabber.

78. The method of claim 51, wherein said picture processing unit reduces computation time on said digital picture by approximately N, where N is an integer.

79. The method of claim 78 wherein N=4.

* * * * *